May 19, 1970     L. A. STENSTROM     3,512,409
PLATFORM FOR INERTIAL NAVIGATION SYSTEMS OR THE LIKE
Filed Dec. 26, 1967
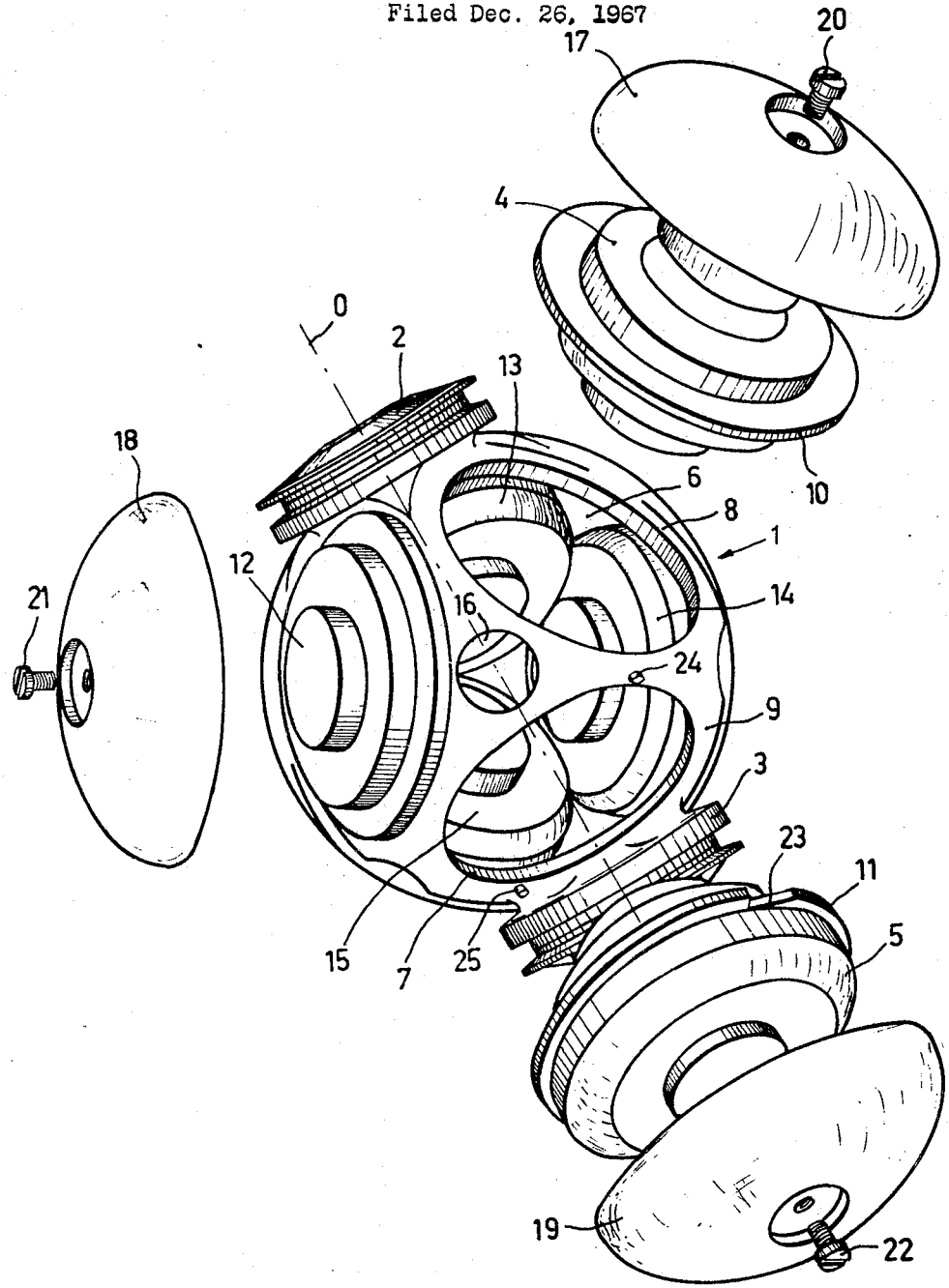
INVENTOR.
LENNART A. STENSTRÖM
BY
*AGENT*

United States Patent Office 3,512,409
Patented May 19, 1970

3,512,409
PLATFORM FOR INERTIAL NAVIGATION SYSTEMS OR THE LIKE
Lennart Arvid Stenstrom, Daggstigen 22, Huddinge, Sweden
Filed Dec. 26, 1967, Ser. No. 693,553
Claims priority, application Sweden, Dec. 27, 1966, 17,764/66
Int. Cl. G01c 21/00
U.S. Cl. 73—178                    6 Claims

ABSTRACT OF THE DISCLOSURE

A holder or platform for inertial components such as gyroscopes and accelerometers, adapted to be gimbal supported in a vehicle and comprising six outwardly facing guide surfaces each cooperating with a guide flange on the components, which guide surfaces are arranged such that they define a cube, a diagonal of which coincides with the axis of rotation for the holder in its gimbal.

---

The invention refers to a gimbal supported holder or stabilized platform for holding inertial components, such as gyroscopes and accelerometers, for example, in systems for inertial navigation or in apparatuses which indicate the attitude angles of a vehicle (course, tilt and roll). An inertial navigation system often comprises three gyroscopes and three accelerometers, thus altogether six components which shall be mounted within the space available for the platform and components. This is for example the case in certain conventional systems where three single axis gyroscopes stabilize a platform about three orthogonal axes. This is also the case if it is desied to combine two gyroscopes of the two axis type necessary for the stabilization function with an additional gyroscope for special use. The space available for the holder and components is limited by the inner gimbal of the gimbal system and may for example be of spherical shape. In systems adapted to be used in every attitude angle the spherical shape will give maximum inner volume for given outer dimensions.

A requirement on an inertial navigation system is that it shall be possible to rapidly and in a simple way replace the inertial components without losing the accurate adjustment of the components. This can be made possible by using large guide surfaces for the components, which surfaces serve as a base for guide flanges on the components, so that the required angular accuracy is achieved directly with the mounting of the component without the need for expensive after-adjustment, which requires stationary equipment, for example, expensive optical arrangements. On the other hand it is desired to pack the required inertial components in a small space so that the platform unit as a whole will not have large dimensions. Furthermore each component shall be available easily so that it can be mounted and demounted without affecting other components.

A requirement which makes the packing of components difficult is that the input axes of the gyroscope shall be oriented orthogonally as well as the sensitive axes of the accelerometers. Applied to a system with three two-axis gyroscopes this requirement involves in certain system solutions that the spin axis of each gyroscope must be perpendicular to the spin axis of remaining gyroscopes. However, as the spin axis in such gyroscopes coincides with the figure or symmetry axis of the same this involves in turn that the gyroscopes must be mounted such that the figure axes of all gyroscopes are perpendicular to each other. It is therefore not possible when using two-axis gyroscopes to achieve a compact component packing by orienting the figure axes of two gyroscopes parallel, a method which is conventionally used in arrangements of single axis gyroscopes.

The invention refers more particularly to an arrangement for placing in a platform up to six components which are to be mounted in the platform space such that the figure axes of the components are oriented orthogonally, the aim being first to be able to mount and replace components easily and to achieve required accuracy in the adjustment directly at the mounting and also to achieve a high packing compactness and symmetry.

The invention is characterized by a holder or platform for supporting up to six inertial components, which holder is provided with outwardly facing guide surfaces adapted to serve as base for guide flanges on the components, the said guide surfaces are defined by or are parallel with the surfaces of a cube, the diagonal of which coincides with the axis about which the holder rotates in the inner gimbal ring. The guide surfaces are suitably arranged symmetrically three and three about the rotation axis, i.e. the three surfaces which adjoin one bearing are shaped equal and arranged on the same distance from the rotation axis as well as the three opposite guide surfaces, the said last surfaces being different from the said first surfaces, if desired.

If the figure axes of the component are defined as the centre normal to the guide flanges, the new orientation of the components in the platform involves that the figure axes of all components will be oriented obliquely relative to the rotation axes of the platform in the inner gimbal. Due to the angular symmetry of the cube, the oblique setting angle will be equal for all components, more particularly equal to $\operatorname{arctg} \sqrt{2} = 54.8°$. In contrast to conventional systems this means that the input axes of the gyroscopes and accelerometers will be oblique relative to the rotation axis. The gyro signals which are used to control the servomotors of the gimbals must therefore be applied to the said motors in suitable linear combinations (coordinate rotation). For achieving full symmetry the guides surfaces may suitably be arranged such that they coincide with the surfaces on one and the same cube.

For achieving an effective guidance effect the surfaces should be as large as possible and they are therefore placed far from centrum in the platform, which is facilitated by the fact that they are oriented obliquely relative to the rotation axis. Without this oblique orientation the inner gimbal ring (in gimbal systems with four gimbals often called the inner roll ring) the motor or the resolver associated with the shaft of the holder could be obstructive for the mounting or demounting of the components. Large guide surfaces are also advantageous from the point of view that by this means a large thermal contact surface between the holder and its components is obtained. This involves that the component and holder in the thermal respect will substantially follow each other, which also can be expressed such that the number of thermal time constants determining the temperature stabilization of the platform will be small.

If it is assumed that all components have the same requirement of space, the available space for each component will be a cone with spherical base surface. With a suitable, i.e. substantially conical, shape of the components the arrangement with obliquely oriented guide surfaces will result in that the platform can be utilized to nearly 100%. A cone like shape is furthermore natural for gyroscopes, especially free-rotor gyroscopes, where it is desired for achieving a large inertial mass to make the rotor with large diameter, while the driving motor requires essentially smaller space.

The geometrical symmetry will also lead to thermal symmetry, which involves that the number of circuits for temperature regulation of the platform can be decreased appreciably and the temperature increases will take place in the same rhythm for the three gyroscopes of the platform as well as for its three accelerometers. This will result in system advantages, especially in connection with the clear making procedure before start.

The geometrical symmetric is also advantageous from manufacturing and supervision point of view. An other advantage of the symmetry lies in the stability, i.e. elastic changes in the material will produce substantially symmetrical disturbances which only in a limited degree will penetrate as error sources in the system. The mechanical symmetry will also lead to cost reducing symmetry properties in the wiring.

Such an arrangement with the holder built up by a number of guide surfaces situated far from centrum in the platform space will also give the holder a large mechanical rotational stiffness and in combination with the components a relatively large inertial moment which is advantageous from servo point of view.

The invention is particularly suitable in inertial navigation systems with a space fixed platform where the sensitive axes of the gyroscopes and the accelerometers are normally oriented obliquely relative to the horizontal and vertical directions, but it can also be applied to conventional systems with a schuler-tuned vertical indicating platform. The symmetry axis of the holder can at use either be oriented vertically or it can form an angle of $arctg \sqrt{2}$ with the vertical (whereby the gryoscopes and accelerometers can have vertical and horizontal axes, respectively) or have another orientation adapted to the actual system solution.

The invention is illustrated in the accompanying drawing which shows a perspective view partly in the shape of an exploded view of a platform according to the invention, which platform is provided with components of suitable shape. The platform is assumed to be gimbal supported in an airplane and serves for example as a measuring instrument for generating navigational data in an inertial navigation system.

In the drawing reference numeral 1 designates a holder or platform and 2, 3 are bearings connecting the platform with the inner gimbal ring (not shown) of the gimbal system of the platform, so that the platform is rotatable in the inner ring about axis O. The parts, 2, 3 also comprises servo motors and required resolvers and angular transducers and slip ring system or other contact means for the current supply. The inner gimbal is assumed to be circular, whereby the space available for the platform with components will be a sphere with a diameter corresponding to the diameter of the inner gimbal. The platform consists in principle of a mechanically rigid body forming a substantially spherical shell in which recesses for the components are cut. In order to elucidate the construction of the platform two of the components 4, 5 are shown in demounted condition, the corresponding recesses in the platform being visible at 6, 7. Round the recesses there are upwardly facing guide surfaces 8, 9 adapted to serve as base for guide flanges 10, 11 on the components. The platform is adapted for maximum six components and four of these designated 12, 13, 14, 15 are shown mounted in the platform.

The guide surface are according to the invention arranged orthogonally and symmetrically in relation to the rotation axis O. The guide surfaces are more particularly oriented such that each surface corresponds to a side in a cube, the diagonal of which coincides with the rotation axis O. All guide surfaces will hereby be oriented obliquely with the same angle relative to the rotation axis. The oblique setting angle $v$, i.e. the angle between the normal to the guide surfaces and the rotation axis O is determined by the relationship $tgv = \sqrt{2}$ and amounts to ca. 54.8°.

Three of the guide surfaces will adjoin one of the bearings and the three remaining surfaces will adjoin the remaining bearing, it being then suitable to make the three guide surfaces adjoining one and the same bearing unit adapted for one and the same type of components, so that for example components 5, 14 and 15 in the figure are gyroscopes and the components 4, 12 and 13 are accelerometers. It is then not necessary that the guide surfaced for the gyroscopes and the accelerometers are exactly equal or that all guide surfaces define one and the same cube. If required in view of the shape of the components the guide surfaces for one type of components may be parallel displaced relative to the cube formed by the guide surfaces for the other type of component. Of symmetry reasons the guide surfaces should, however, be indentically shaped three and three.

In order to fix one or more components as regards rotation about its figure axis, if required, the flange of the same is preferably provided with two recesses 23 or pins which are brought to engage corresponding pins 24 and 25 or recesses on the guide surfaces of the holder, so that also this guiding function will have so wide base as possible. The guidance function obtained by the pins 24 and 25 can be made very accurate if a small segment of pins is cut away by milling, preferably in connection with the plane milling of the surface, which guides component 12. The guide surfaces on the side of the two pins thus obtained will then be accurately parallel with the ring shaped guide surface against which the component 12 is mounted. In this way all guidance of the six components can be defined by plane guide surfaces—no cylindrical surface has to be accurately manufactured.

If further improved guidance with regard to motion about the figure axis of the components is required the described platform arrangement allows that the guide flange of the component is increased by means of projections in certain directions, in which case the pins used for guidance in the holder are placed on greater distance from each other with a wider base for the guidance as a consequence.

As regards demounting and mounting the inner gimbal ring as well as remaining gimbals can always be put away so that all components in the platform are easily available. The oblique orientation of the guide surfaces then highly facilitates the mounting, and demounting and makes possible that the guide surfaces are placed far from centrum in the platform space, i.e. are made large, without which the demounting is obstructed by bearings and gimbals. The components are furthermore quite free from each other and are demountable separately.

The platform is suitably made in one piece and for example manufactured by moulding. After the moulding the guide surfaces are treated accurately on their outside, for example by means of plane milling, which is facilitated by the simple cube geometry.

At those places of the platform corresponding to the corners of the said cube, there will be empty spaces due to the rotational symmetry of the components. At these places there is suitably made borings 16 in which remaining apparatuses, electronics etc. can be placed.

In order to be protected against disturbing magnetic fields the platform components must be magnetically screened from the surroundings. In order to further meet the requirement for separate mounting and demounting of the components, each of these can be provided with a separate magnetic screen, as shown in the drawing by the segment shaped portions 17, 18, 19. These shields of magnetically high permeable material are screwed on the respective components by means of screws 20, 21, 22 and will form in mounted condition a practically continuous magnetic shield for the platform.

What is claimed is:

1. A holder for an inertial navigation system which is rotatably mounted on a gimbal, comprising a hollow partially spherical platform having a plurality of symmetrically arranged planar holes defining surfaces parallel to the surfaces of a cube, the periphery of said holes forming guide surfaces for inertial navigation components, means for permitting rotation of said platform about an axis coinciding with the main diagonal of the cube including two bearings for rotatably mounting said holder to the gimbal located at opposite positions of said platform along the main diagonal of the cube.

2. An inertial holder as claimed in claim 1 wherein the platform further includes holes for the mounting of additional components.

3. A holder as claimed in claim 2 characterized in that the said plurality of holes numbers six and are arranged symmetrically three and three relative to the rotation axis.

4. A holder as claimed in claim 2 characterized in that the guide surfaces define the surfaces of one and the same cube.

5. A holder as claimed in claim 2 characterized in that the guide surfaces for achieving effective guidance and good thermal contact are situated far from centrum of the enclosed platform space.

6. A holder as claimed in claim 2 characterized in that said platform is provided with guide pins adapted to cooperate with the inertial navigation components for fixing the same with respect to rotation about axes which are perpendicular to the outwardly facing guide surfaces of the platform.

References Cited

UNITED STATES PATENTS 3,162,052   12/1964   Anderson et al.  ------ 73—504
3,269,179   8/1966   Anderson  -------- 33—226 XR DONALD O. WOODIEL, Primary Examiner U.S. Cl. X.R.

73—431